United States Patent
Katayama

(10) Patent No.: US 8,050,532 B2
(45) Date of Patent: Nov. 1, 2011

(54) DIGITAL CAMCORDER HAVING DISPLAY UNIT

(75) Inventor: Tatsushi Katayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1252 days.

(21) Appl. No.: 11/692,295

(22) Filed: Mar. 28, 2007

(65) Prior Publication Data

US 2007/0230916 A1  Oct. 4, 2007

(30) Foreign Application Priority Data

Apr. 4, 2006  (JP) ................. 2006-103227

(51) Int. Cl.
*H04N 5/77* (2006.01)
*H04N 5/935* (2006.01)
(52) U.S. Cl. ....................... 386/210; 386/224
(58) Field of Classification Search .............. 386/210, 386/224, 230, 252, 326
See application file for complete search history.

(56) References Cited

U.S. PATENT DOCUMENTS

| 6,141,036 A | 10/2000 | Katayama et al. ............ 348/47 |
| 6,385,386 B1 | 5/2002 | Aotake |
| 7,006,421 B2 | 2/2006 | Katayama ................. 369/59.22 |
| 7,561,297 B2 | 7/2009 | Shigeeda |
| 2005/0168594 A1* | 8/2005 | Larson ....................... 348/222.1 |
| 2006/0119724 A1* | 6/2006 | Inuiya ........................... 348/311 |
| 2007/0126890 A1 | 6/2007 | Katayama ............... 348/231.99 |

FOREIGN PATENT DOCUMENTS

| JP | 11-039850 | 2/1999 |
| JP | 2000-138888 A | 5/2000 |
| JP | 2001-111877 | 4/2001 |
| JP | 2006-080651 A | 3/2006 |

* cited by examiner

*Primary Examiner* — Robert Chevalier
(74) *Attorney, Agent, or Firm* — Fitzpatrick, Cella, Harper & Scinto

(57) ABSTRACT

A digital camcorder records an image of an object as a moving image on a recording medium, and displays an image recorded during a period from the start of image taking to a predetermined time on a screen while recording a currently taken image.

5 Claims, 10 Drawing Sheets

DIGITAL CAMCORDER HAVING DISPLAY UNIT

BACKGROUND OF THE INVENTION

1. Field of the Invention

The present invention relates to a digital camcorder for taking a moving image, having a display unit such as a liquid crystal display (LCD) monitor or an organic EL.

2. Description of the Related Art

Although as a prevailing type of digital camcorder, migration from a magnetic tape type to an HDD recording type is ongoing, a type of digital camcorder using a DVD, which is an optical disk, as a recording medium is emerging in recent years. Such a DVD type digital camcorder is disclosed in Japanese Patent Application Laid-Open No. 2001-111877.

In the conventional digital camcorder as described above, a currently taken image is displayed on a liquid crystal monitor in a record mode. When a taken image is checked, the image recorded is displayed on the LCD monitor by interrupting image taking by operating a button and switching from a record mode to the playback mode.

In the digital camcorder described in Japanese Patent Application Laid-Open No. 2001-111877, when a taken image is checked, the mode is switched to the playback mode, and a thumbnail of an image recorded on a DVD is developed in a memory to display the thumbnail on the liquid crystal monitor.

However, depending on an object's situation, the timing for starting image taking may occur suddenly. In such a case, a user may press the recording button in a hurry and continue image taking while in doubt as to whether an image at the beginning of the image taking has been recorded or not. Then, for example, when the user checks the recorded image after a 30-minute image taking operation, the user may finally know that the beginning of the image taking has failed and feel disappointed.

In another case, an obstacle may come subtly in front or back of an object or within an image taking frame at the start of image taking. Also in this case, the user may not determine whether or not an image should be taken again from the first, and may feel disappointed after the image taking.

Japanese Patent Application Laid-Open No. H11-39850 describes a stationary type recording and reproducing apparatus which employs one of a hard disk and an optical disk as an information recording medium. In the apparatus, image data and audio data of a digital camcorder, a video tape recorder or the like are input therein, and may be recorded, reproduced and edited. While the apparatus records information on an information recording medium, the apparatus can reproduce information already recorded on the information recording medium from any point of the already recorded information.

As described above, the recording and reproducing apparatus has a function of reproducing information already recorded on an information recording medium from any point of the already recorded information while recording moving image information on the information recording medium. However, since the recording and reproducing apparatus is a stationary type system having a personal computer and an external apparatus, and its function is not implemented in a portable digital camcorder itself, the convenience of using a digital camcorder during image taking still cannot be solved by this apparatus.

SUMMARY OF THE INVENTION

Therefore, the present invention provides a digital camcorder which can display a recorded image, especially an image taken from the start of image taking, and the image can be checked.

The digital camcorder according to the present invention is a digital camcorder for recording an image of an object as a moving image on a recording medium, includes:

an image capturing optical system;

a recording medium drive for recording an image obtained through the image capturing optical system on the recording medium;

a display for displaying the obtained image; and an image display processing portion for causing the display to display an image for a predetermined time from the start of image taking during the image taking.

Further features of the present invention will become apparent from the following description of exemplary embodiments with reference to the attached drawings.

DESCRIPTION OF THE EMBODIMENTS

Each embodiment will be described in the following. The first and third embodiments correspond to the invention for displaying an image recorded during a period from the start of image taking to a predetermined time (a fixed period of time) on a screen while recording a currently taken image. The second embodiment corresponds to the invention for displaying an image recorded during a period from the start of image taking to a predetermined time (an optional period of time) on a screen while recording a currently taken image.

First Embodiment

The first embodiment of the present invention will be described with reference to FIGS. 1, 2 and 3A to 3C.

Figure 1:
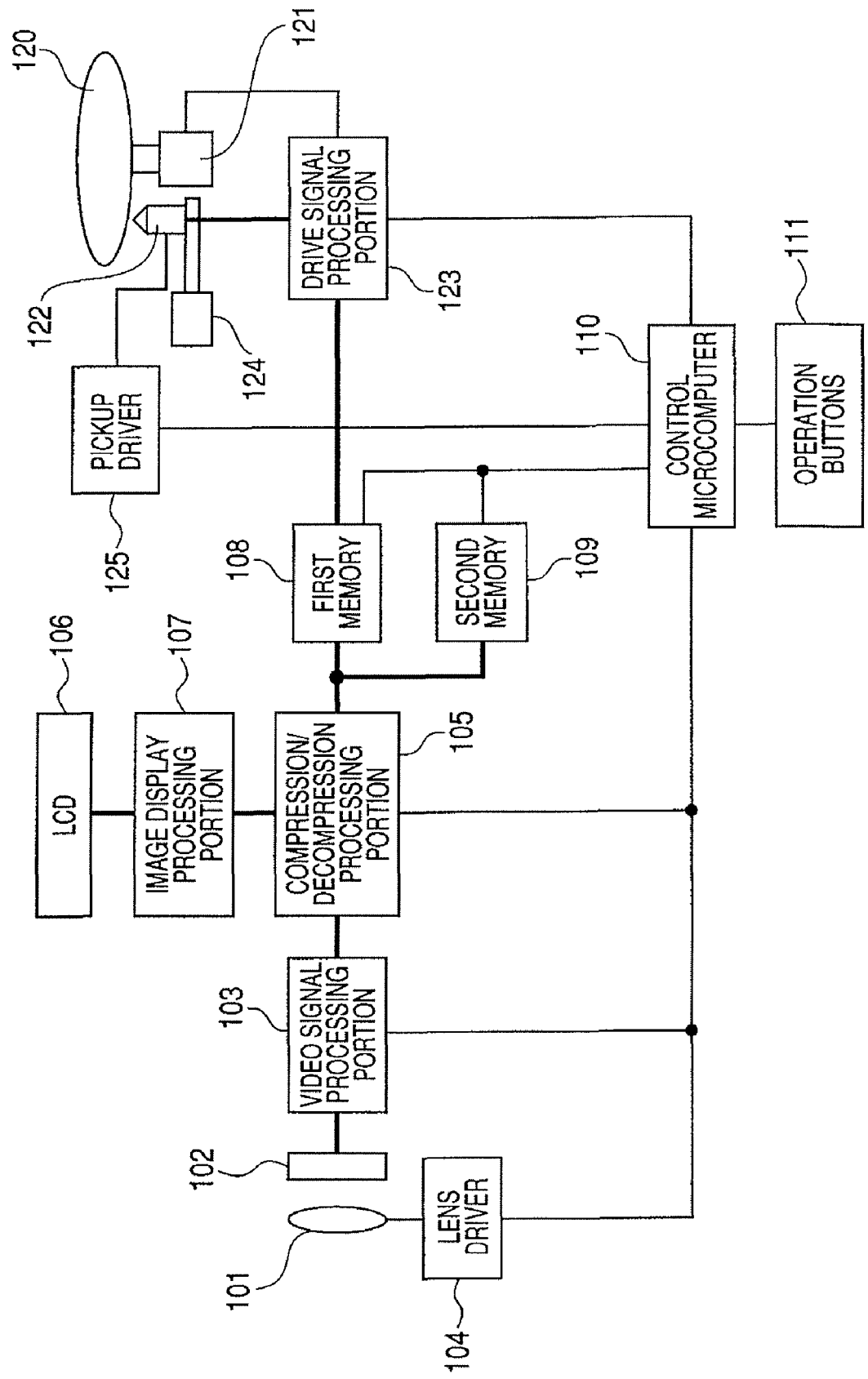
FIG. 1 is a block diagram illustrating a first embodiment of a digital camcorder according to the present invention.

FIG. 1 is a block diagram which generally illustrates a digital camcorder apparatus according to the present embodiment.

An internal configuration of each part will be described below.

The apparatus of FIG. 1 includes a lens 101, an image pickup sensor 102 such as a CCD, an image signal processing portion 103, a lens driver 104 for driving a lens, a compression/decompression processing portion 105 for compressing/decompressing a video or audio signal, an LCD as a display 106, an image display processing portion 107, a first memory 108, a second memory 109, a control microcomputer 110, and operation buttons 111, such as a recording start button. The lens 101 and the image pickup sensor 102 are components of an image capturing optical system. The apparatus further includes components 120 to 125 of a recording medium drive. Although a disk 120 as a recording medium is an optical disk here, the type of recording medium may be a tape. A spindle motor 121 rotates the disk. A pickup 122 records or reproduces a signal on or from the disk 120. A drive signal processing portion 123 processes one of a reproduction signal and a recording signal. A feed motor 124 moves the pickup in the radial direction. A pickup driver 125 drives an actuator and a laser, which perform focus and tracking control of the pickup.

An image of an object is photoelectrically converted through the lens 101 by the image sensor 102. Such a converted electric signal is converted to an image signal by the video signal processing portion 103. The image signal is supplied to the compression/decompression processing portion 105 and converted to a digital compressed video signal. As a compression method, well known technologies such as a JPEG method for a still image and an MPEG method for a moving image are used. On the other hand, the video signal is displayed on the LCD 106 through the image display processing portion 107.

The compressed video signal is sequentially stored in the first memory 108. Then, the video signal stored in the first memory 108 is recorded on the disk 120. At first, the disk 120 is rotated by the spindle motor 121. Then, the pickup driver 125 controls focus and tracking actuators of the pickup 122 to perform servo control. After normal servo control is achieved, seeking to a recording address position is performed as needed. Then, recording is started from the desired recording address after a rotational delay to reach the recording address. In addition, the second memory 109 retains image data corresponding to a certain time period (e.g., five seconds) just after a recording start button of the operation buttons 111 is pressed.

A check sequence of an image of the beginning of image taking will next be described.

Figure 2:
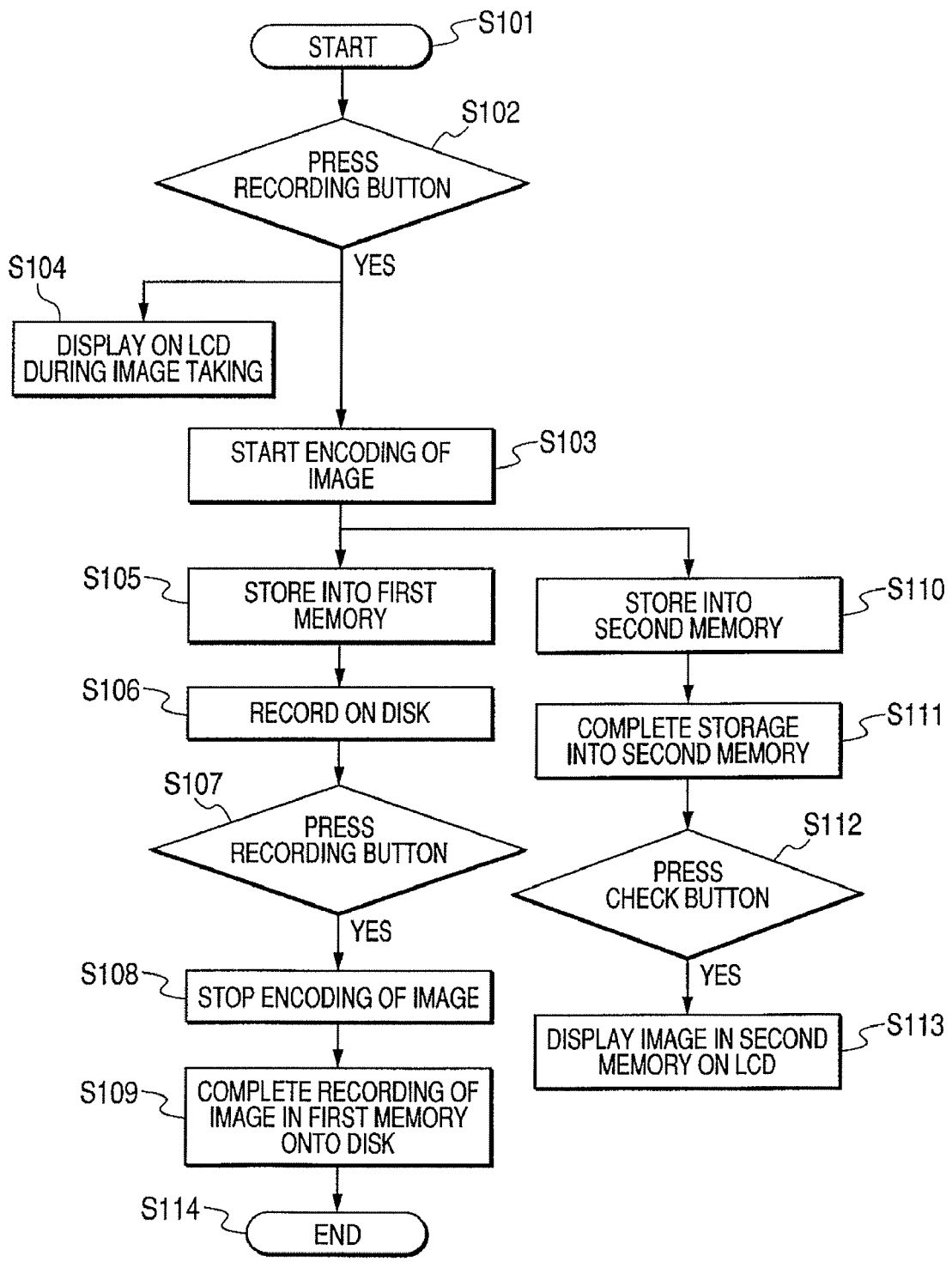
FIG. 2 is an operational flow diagram of the digital camcorder of FIG. 1.

FIG. 2 is an operational flow diagram of a digital camcorder.

In FIG. 2, the digital camcorder is powered on and ready to take an image in S101. Then, in S102, whether a recording button is pressed or not is determined. When a press of the recording button is detected, encoding of a currently taken image is started in S103. In S105, the encoded image data is stored in the first memory 108. In addition, when the recording button is pressed in S102, the image is displayed on a display such as the LCD 106 by a video signal during image taking in S104.

In S106, the image data stored in the first memory 108 is recorded on the disk 120 at a predetermined timing.

When a press of the recording button is detected again in S107, a sequence of image taking is stopped. Firstly, the encoding of the image is stopped in S108. Then, in S109, all of the image stored in the first memory 108 is recorded on the disk 120. After the recording is completed, the sequence of image taking is terminated in S114.

On the other hand, the encoded image data is also recorded in the second memory 109 in S110. The image data stored in the first memory 108 and the second memory 109 is the same image data. However, in the second memory 109, only a predetermined amount of the image data corresponding to a time period just after the start of image taking is stored and retained. The predetermined amount can be set as follows. For example, when a maximum rate during encoding is N (bps), a capacity of N×5 (bit) for 5-second encoding is determined as the predetermined amount. Since a normal image rate is lower than a maximum rate, storage of 5-second image can be ensured according to the setting as described above.

In S111, the storage of the image data into the second memory 109 is completed. After the storage is completed, by pressing a check button that is one of the operation buttons in S112, the image data is allowed to be checked. In addition, after the storage for the second memory 109 is completed in S111, any symbol is displayed on the screen of the LCD 106 for announcement to a photographer.

When the press of the check button is detected in S112, the image in the second memory 109 is displayed on the LCD 106 in S113. This display of the image in the second memory 109 is performed by decompressing the image through the compression/decompression processing portion 105, and generating a display screen of the LCD through the image processing portion 107.

Figure 3A:
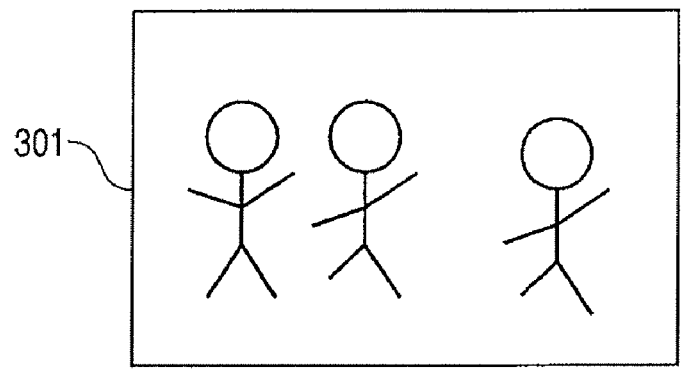
FIGS. 3A, 3B and 3C are schematic views illustrating examples of display screens on the digital camcorder of FIG. 1.
Figure 3B:
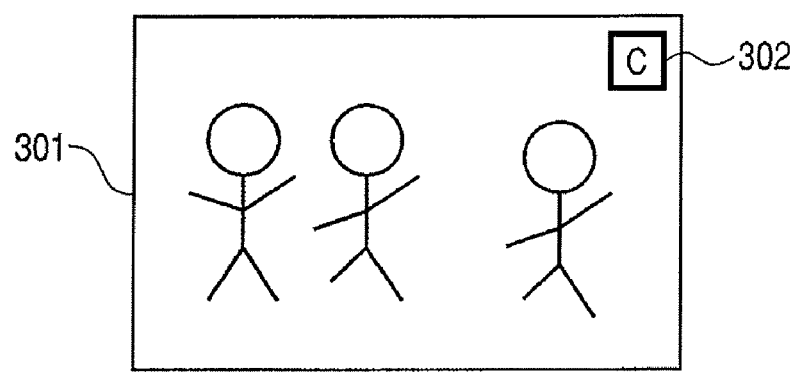
Figure 3C:
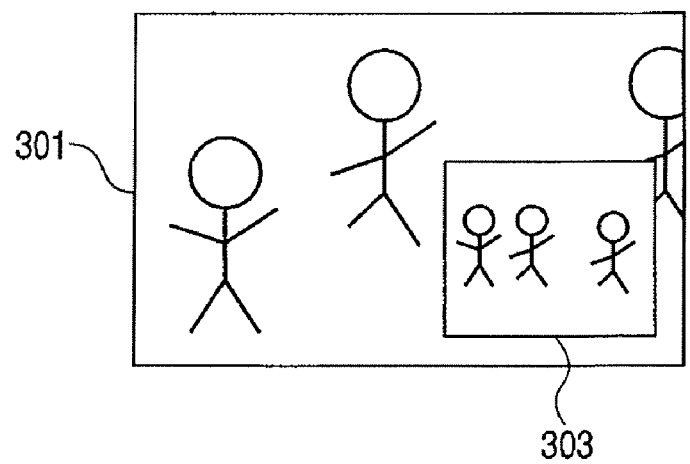

FIGS. 3A to 3C illustrate screen configurations of the LCD corresponding to a flow led to a check of an image as described above.

FIGS. 3A to 3C are schematic views of a display screen of the digital camcorder according to the present embodiment.

FIG. 3A illustrates a display screen at a time when the recording button is pressed in S102, which is a main screen 301. FIG. 3B illustrates a display screen just after the predetermined amount of the image data is stored in the second memory 109 in S111. At this time, a symbol 302 is displayed in the main screen 301 to announce that an image of the beginning of image taking can be checked.

FIG. 3C illustrates a screen configuration where an image is being checked. As the main screen 301, a currently taken image is displayed. In a sub screen 303, an image stored in the memory 109 corresponding to a few seconds from start of image taking is displayed.

At any time after image taking is started and then storage of image data into the second memory 109 is started, an image immediately after image taking can be checked. Therefore, since checking is allowed even during image taking, a user can check the image of the beginning of the image taking and stop the image taking so as to be ready for a next timing of recording.

As described above, in the present embodiment, an image recorded for a period corresponding to a certain time period from the start of image taking is retained in a dedicated memory and displayed during the image taking. The dedicated memory is provided separately from a memory for retaining an image to be recorded on a recording medium. Therefore, apparatus configuration and control can be simplified.

Second Embodiment

The second embodiment according to the present invention will be described below with reference to FIGS. 4 and 5.

Figure 4:
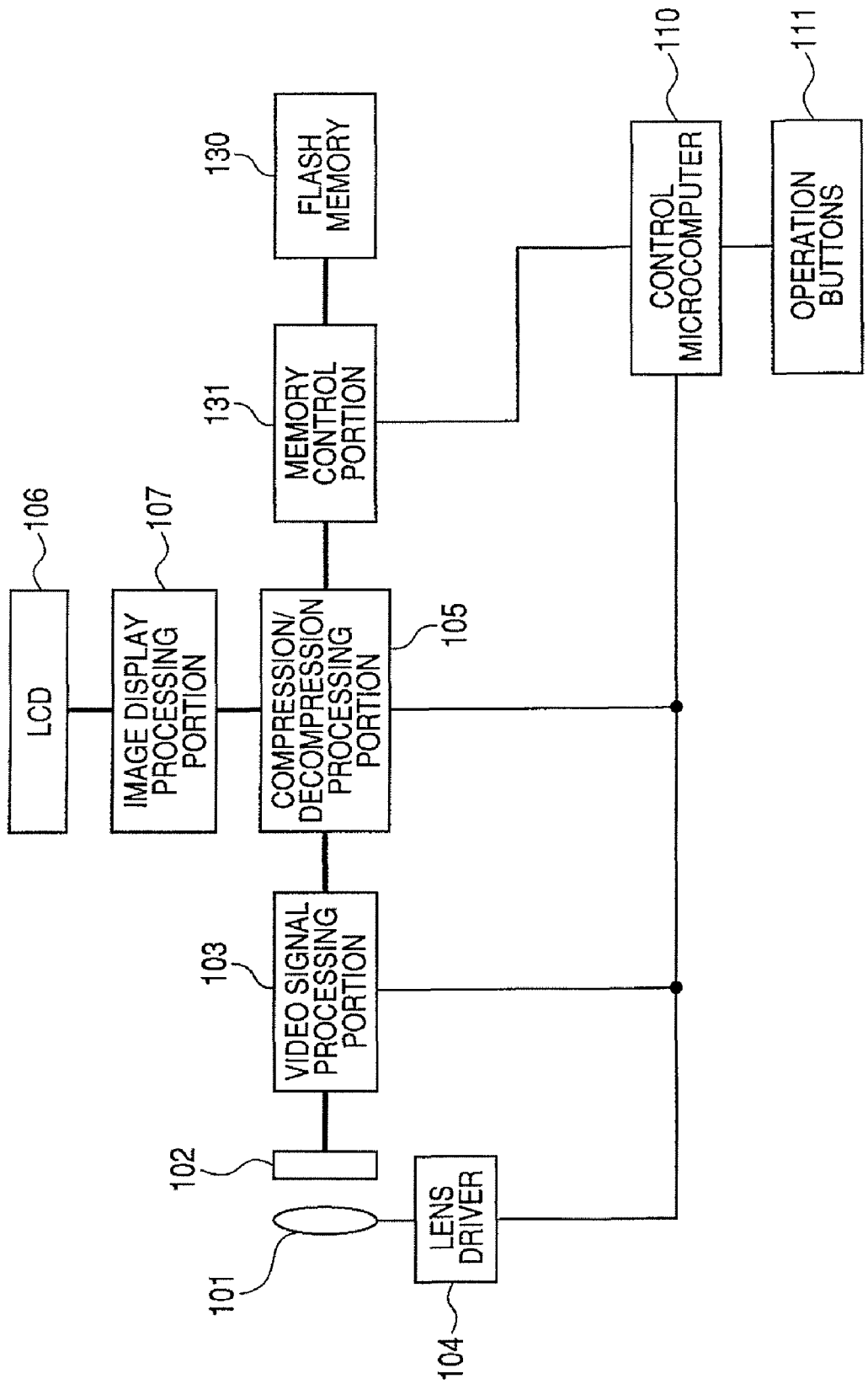
FIG. 4 is a block diagram illustrating a second embodiment of the digital camcorder of the present invention.
Figure 5:
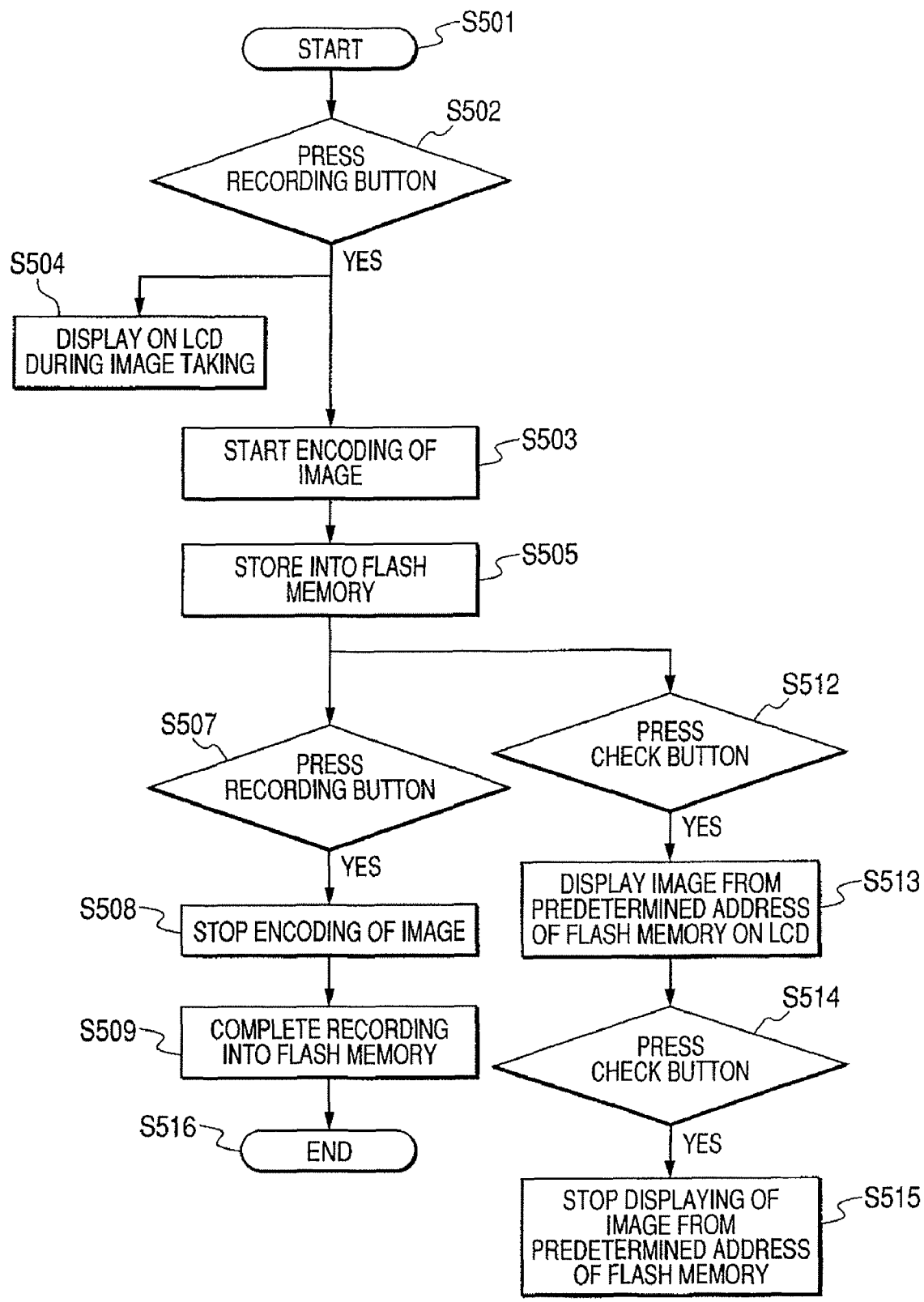
FIG. 5 is an operational flow diagram of the digital camcorder of FIG. 4.

FIG. 4 is a block diagram which generally illustrates a digital camcorder according to the present embodiment. FIG. 5 is an operational flow diagram of the digital camcorder according to the present embodiment.

The internal configuration of each part will first be described. A block having the same number as in FIG. 1 also acts in a similar way so that a description thereof is omitted.

The digital camcorder of the present embodiment uses, as a recording medium, a flash memory which is one example of a semiconductor memory. In FIG. 4, a flash memory 130 records image data, and a memory control portion 131 controls the memory. The flash memory 130 and the memory control portion 131 are components of a medium drive.

The flow of the operation of the camcorder and image taking will be described with reference to FIGS. 4 and 5.

In S501, after power-on and activation are performed, the status becomes a standby state. When a recording button is pressed in S502, image taking is started. When the control microcomputer 110 instructs the compression/decompression processing portion 105 to start encoding, encoding of an image is started in S503. In addition, a currently taken image is displayed on a display such as the LCD 106 in S504.

In S505, the encoded image is recorded in the flash memory 130 through the memory control portion 131. During image taking, the encoded image data is sequentially recorded in the flash memory 130 at a transfer rate depending on a content of the image.

When the recording button is pressed again in S507, the image taking is stopped. In S508, the control microcomputer 110 instructs the compression/decompression processing portion 105 to stop its processing so that encoding of the image is stopped.

Further, in S509, it is confirmed that all of the compressed image is recorded in the flash memory 130, and recording is completed. Then, the sequence of image taking is terminated in S516.

At this time, the control microcomputer 110 retains a value of a leading address from which the image data is recorded when storage into the flash memory 130 is started in S505.

When a check button is pressed in S512, the control microcomputer 110 notifies the retained leading address to the memory control portion 131 to read out image data from such specified address of the flash memory 130. The read-out image is decompressed by the compression/decompression processing portion 105 and converted by the image display processing portion 107, and then displayed on the LCD 106.

When the check button is pressed once again in S514, display of the image to be checked is stopped.

In the digital camcorder of the present embodiment, a flash memory is used as a recording medium, and an image for checking the beginning of image taking is generated and displayed by reading out a portion of the flash memory. Therefore, the time period over which an image be checked is recorded equals the length of the recording time permitted by the capacity of the flash memory, and thus is not limited to a few seconds. Therefore, checking of an image for any period of time is enabled depending on the time interval between ON and OFF of a check button according to a user operation.

As described above, in the present embodiment, recorded taken image data can be read out from a recording medium on which the taken image data is recorded so that a taken image data recorded for a period corresponding to any period of time from the start of image taking can be checked during image taking. Therefore, a memory and a disk drive mechanism for temporarily storing data are not required, and a simpler configuration is allowed.

Third Embodiment

The third embodiment according to the present invention will be described below with reference to FIGS. 6 to 10.

Figure 6:
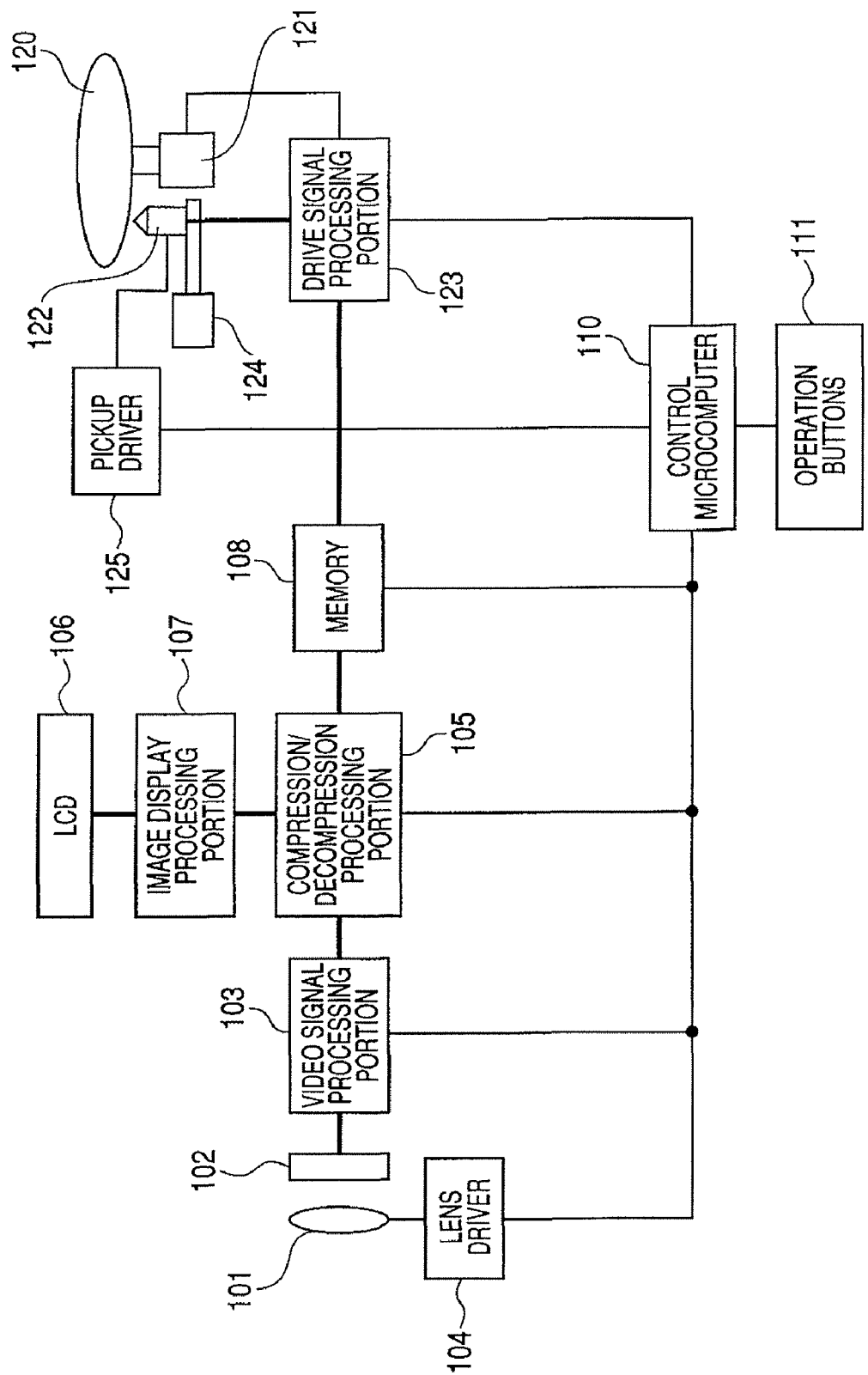
FIG. 6 is a block diagram illustrating a third embodiment of the digital camcorder of the present invention.

FIG. 6 is a block diagram which generally illustrates a digital camcorder according to the present embodiment.

The internal configuration of each part will first be described. A block having the same number as in FIG. 1 also acts in a similar way so that a description thereof is omitted. However, the second memory 109 of FIG. 1 does not exist and the first memory 108 is a single memory in this embodiment.

A feature of the present embodiment is to achieve both of normal image taking and checking of an image of the beginning of image taking by a single memory in a recording and reproducing apparatus using an optical disk similar to the apparatus of the first embodiment.

At first, an intermittent recording using an optical disk will be described.

Generally, the rate at which image data is recorded on a disk from a memory is faster than the rate at which image data is transferred to the memory. For example for a DVD, the transfer rate of an image is typically 4 to 6 Mbps, and the rate of transfer to a disk is typically 24 Mbps.

Therefore, a disk drive can be suspended until a predetermined amount of compressed image data is stored in a memory.

Figures 7A, 7B, 7C:
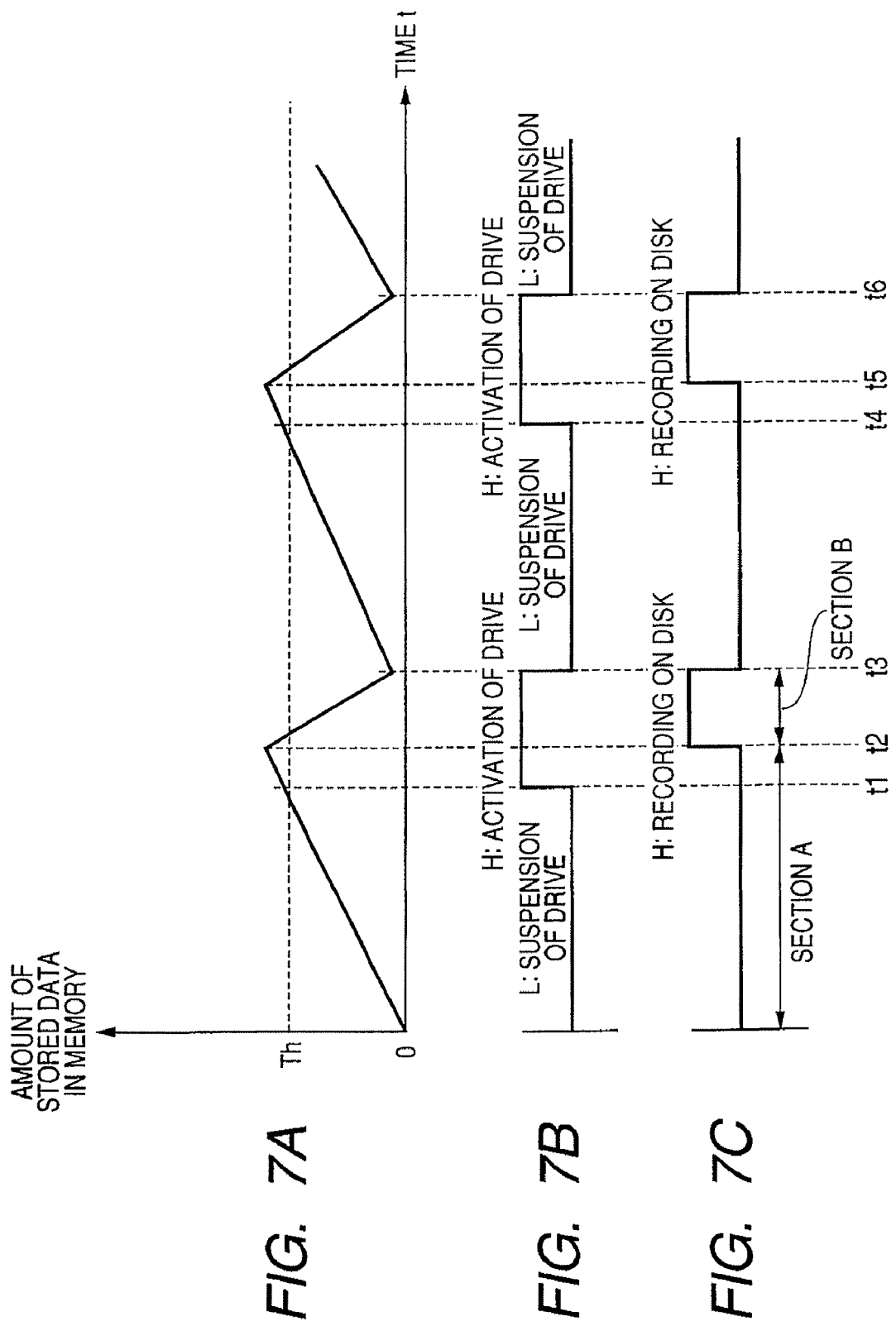
FIGS. 7A, 7B and 7C are diagrams illustrating an intermittent operation of recording/reproducing in the digital camcorder of FIG. 6.

FIGS. 7A to 7C are diagrams which illustrate intermittent operation of a digital camcorder.

FIG. 7A illustrates the data storage amount in the memory, FIG. 7B illustrates the suspension of the drive and a control signal of activation, and FIG. 7C illustrates a control signal of a recording timing. In FIG. 7A, a threshold Th of the amount of stored data in the memory is set for intermittent operation. While the drive is suspended, data is stored in the memory 108. When the data storage amount reaches the threshold Th at time t1, the drive is activated and servo-controlled to seek to a predetermined track. After the seek is completed, recording is started at time t2 so that the data in the memory 108 is recorded. At time t3, the drive is suspended again. Specifically, the spindle motor 121 is stopped to stop rotation of the disk 120, or servo control is stopped and a laser is turned off to reduce the power consumption of the disk drive.

As described above, recording is performed while suspension and activation are repeated alternately.

An outline of reading and writing of the memory will now be described.

Figure 8:
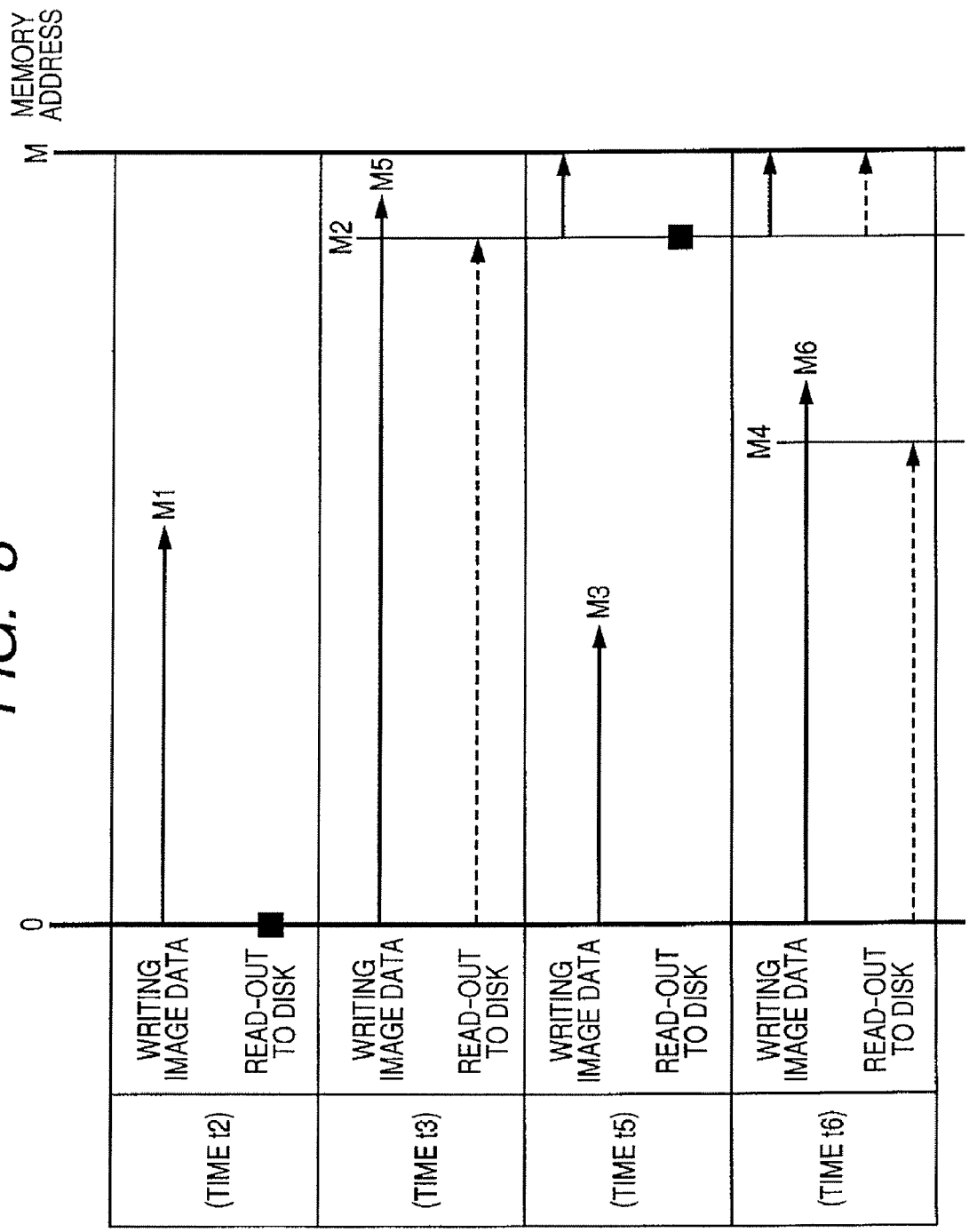
FIG. 8 is a diagram illustrating memory control of the digital camcorder of the FIG. 6.

FIG. 8 is a diagram which illustrates memory control of the digital camcorder.

FIG. 8 illustrates a state of writing of image data into the memory 108 and a state of reading out of image data from the memory 108 to the disk 120 at each of the time points t2, t3, t5 and t6.

The time t2 is a time point just before the drive is activated and starts writing into the disk 120. As shown in FIG. 8, at t2, image data has been written at addresses 0 to M1. Read-out to the disk 120 has not been performed yet.

At t3, image data has been written up to address M5. In addition, a first read-out to the disk 120 has been performed so that data of addresses 0 to M2 has been recorded on the disk 120.

Therefore, data of addresses 0 to M2 of the memory 108 can be overwritten.

At t5, writing of image data has proceeded to address M3 from address 0 subsequently after it reached the upper limit address M from address M5.

On the other hand, as shown in FIG. 7, the drive is suspended from t3 to t4, and activated again just before t5. Therefore, the position of the drive on the memory at t5 is still address M2 where the previous read-out was performed at t3.

A second recording to the disk 120 is started at t5, and recording is performed from address M2 to address M until t6. Subsequently, image data from address 0 to address M4 is read out and recorded on the disk 120.

By repeating the above described sequence, image data is recorded on the disk 120 intermittently.

Figure 9:
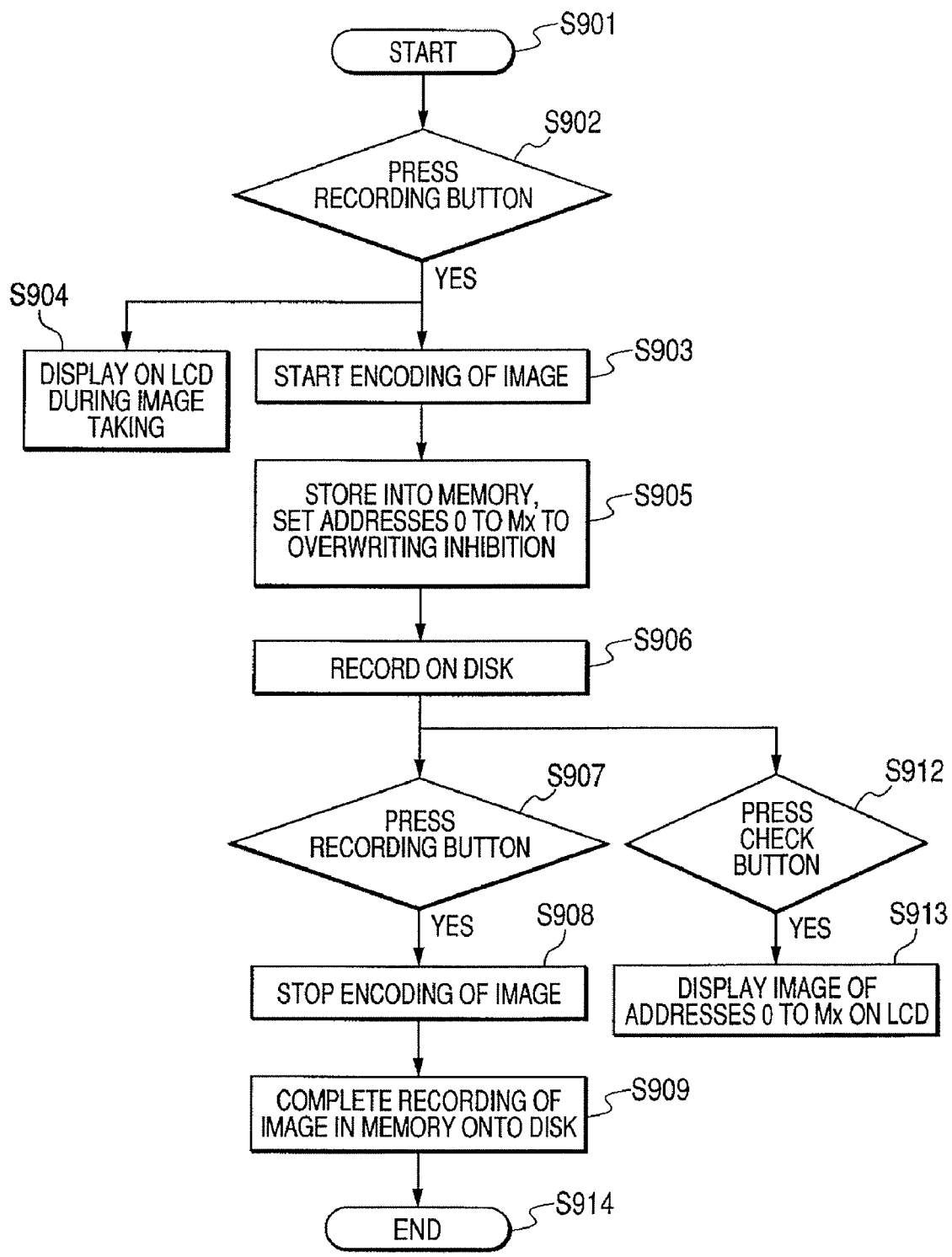
FIG. 9 is an operational flow diagram of the digital camcorder of FIG. 6.

FIG. 9 is an operational flow diagram of the digital camcorder.

The operational flow is a flow for checking an image of the beginning of image taking.

In S901, after power-on and initial activation are performed, the operation is started. When a recording button is pressed in S902, compression encoding of an image is started in S903. In addition, a currently taken image is displayed on the LCD 106 in S904.

In S905, the encoded image data is stored in the memory 108.

An outline of writing of image data in the memory 108 and read out of the data to the disk 120 will now be described.

Figure 10:
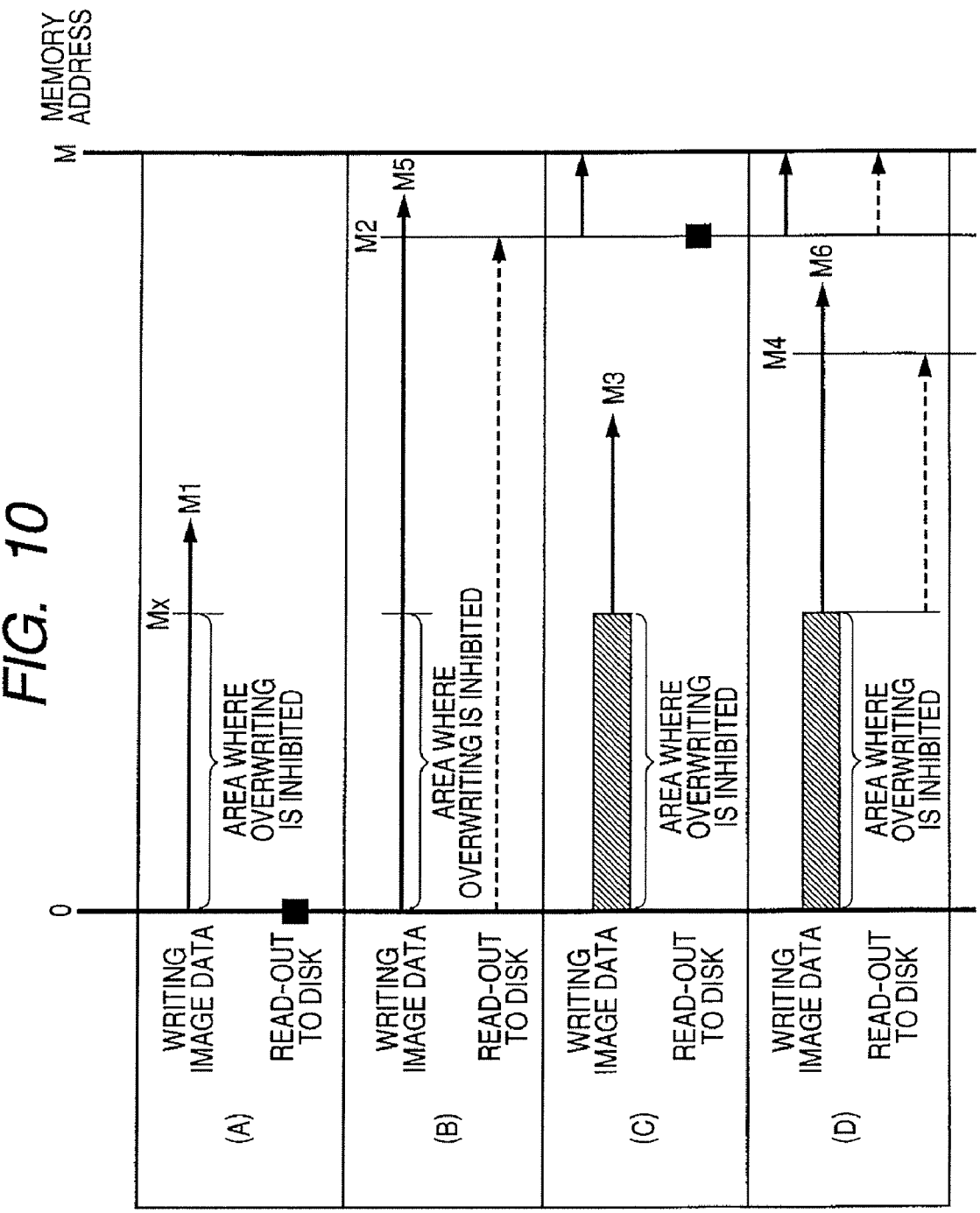
FIG. 10 is a diagram illustrating memory control of the digital camcorder of FIG. 6.

FIG. 10 is a diagram which illustrates memory control of the digital camcorder.

In the present embodiment, to achieve an intermittent operation for a normal image and a check operation for an image of the beginning of image taking by a single memory, writing of image data from an storage starting address 0 to address Mx is allowed only once, and a second or later writing at these addresses is set to be inhibited. FIG. 10A illustrates a first writing, and therefore image data has been written up to address M1.

In S906, the image stored in the memory 108 is recorded on the disk 120. FIG. 10B illustrates a situation just after the fist recording to the disk 120. Writing of image data has proceeded up to address M5, and image data of addresses 0 to M2 has been recorded on the disk 120.

Accordingly, image data can be overwritten at addresses 0 to M2 conventionally. However, in the present embodiment, since image data of addresses 0 to Mx is retained for checking the beginning of image taking, these addresses are set as an area where overwriting is inhibited.

Therefore, in FIG. 10C, after the writing reaches address M from address M5, subsequent image data is overwritten from address Mx. In FIG. 10C, image data is written up to address M3.

In FIG. 10D, a second recording to the disk 120 is performed so that image data of addresses M2 to M and addresses Mx to M4 is read out and recorded on the disk 120.

Therefore, image data of the beginning of image taking is retained at addresses 0 to Mx even during normal image taking.

When the recording button is pressed again in S907 of FIG. 9, the image taking is stopped, and compression encoding is stopped in S908. Then, all of remaining images retained in the memory 108 are recorded on the disk 120, and the image taking is terminated in S914.

In addition, when the check button of the operation buttons 111 of FIG. 6 is pressed in S912, image data of addresses 0 to Mx of the memory 108 is decompressed by the compression/decompression processing portion 105. Then, the image data is converted to a display signal by the image display processing section 107 so as to be displayed on the LCD 106.

Since such display image is similar to that of FIG. 3, a description thereof is omitted.

However, while an image of the beginning of image taking is displayed as a sub screen in a certain area of the main screen in FIG. 3, a screen can be divided into two areas to display an image of the beginning of image taking in one of the areas. Further, an image of the beginning of image taking may be displayed larger by switching between the main screen and the sub screen.

In the present embodiment, only a regular memory is used in a digital camcorder using an optical disk, and a portion of the memory used for intermittent recording to an optical disk is assigned for retention of image data recorded during a certain time period. As a result, an image of the beginning of image taking can be retained and displayed during the image taking so that functionality can be provided at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-103227 filed on Apr. 4, 2006, which is hereby incorporated by reference herein.

What is claimed is:

1. A digital camcorder for recording an image of an object as a moving image on a recording medium, comprising:
   an image capturing optical system;
   a recording medium drive configured to record an image obtained through the image capturing optical system on the recording medium;
   a display configured to display the obtained image; and
   an image display processing portion configured to cause the display to display, during image taking, an image recorded during a period from the start of image taking to a predetermined time thereafter, by pressing of a check button that is one of a plurality of operation buttons.

2. The digital camcorder according claim 1, further comprising:
   a first memory configured to retain a currently taken image, wherein the image retained in the first memory is recorded on the recording medium by the recording medium drive; and
   a second memory configured to retain an image recorded from the start of image taking to a predetermined time thereafter, wherein the image recorded during the period from the start of the image taking to the predetermined time thereafter is read out from the second memory and displayed on the display.

3. The digital camcorder according claim 1, further comprising:
   a memory configured to temporarily retain a currently taken image, wherein the recording medium drive intermittently records the image retained in the memory on the recording medium; and
   a circuit configured to set an area in which an image recorded during a period from the start of image taking to a predetermined time thereafter is retained, as an area where overwriting is inhibited, wherein the image recorded during the period from the start of the image taking to the predetermined time is read out from the memory and displayed on the display.

4. The digital camcorder according claim 1, wherein the image recorded during the period from the start of the image taking to the predetermined time is displayed in a screen on which a currently taken image is displayed.

5. The digital camcorder according claim 1, wherein the recording medium is a flash memory, and the image recorded during the period from the start of the image taking to the predetermined time is read out from a flash memory and displayed on the display.

* * * * *